May 17, 1960
G. K. NEUHAUS
2,936,620
FLOW METER
Filed June 26, 1956
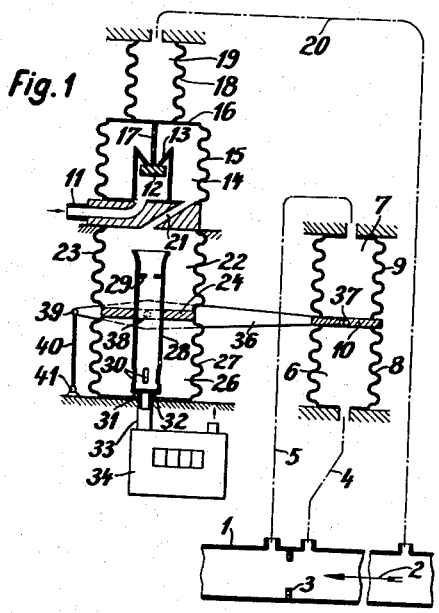
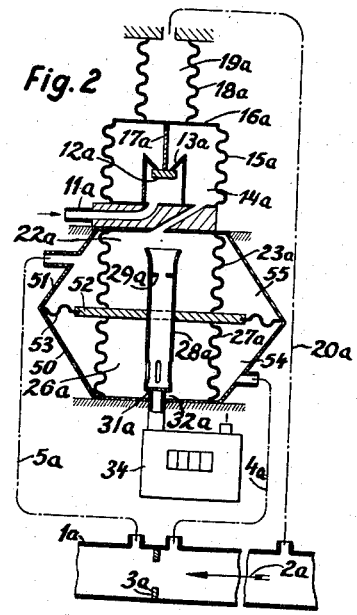
Inventor:
Gustav Neuhaus
By
Patent Agent

2,936,620
FLOW METER

Gustav K. Neuhaus, Essen-Stadtwald, Germany

Application June 26, 1956, Serial No. 594,032

Claims priority, application Germany June 29, 1955

9 Claims. (Cl. 73—202)

The present invention relates to flow meters in which the quantity of flow is measured by means of an auxiliary fluid flow which is proportional to the said quantity of flow.

It is an object of the present invention to increase the precision of this type of flow meters.

The invention is illustrated by way of example in the accompanying drawings in which:

Fig. 1 diagrammatically illustrates a first embodiment of a flow meter according to the invention, and Fig. 2 is a simplified modification of the flow meter according to Fig. 1.

Referring now to Fig. 1 in detail, the reference numeral 1 designates the main line through which the fluid passes in the direction of the arrow 2. It is the quantity of flow through the said main line 1 which is to be measured. The main line 1 is provided with a restricted orifice or orifice plate 3 acting as restrictor for producing the effective head. As will be evident from Fig. 1, a branch conduit 4 branches off from the main line 1 ahead of the orifice plate 3, while similarly a branch conduit 5 branches off from the main line 1 behind the orifice plate 3. The conduits 4 and 5 respectively lead to the chambers 6 and 7 of spring bellows 8 and 9 separated from each other by a partition 10.

The auxiliary fluid delivery conduit 11 is adapted to feed into the chamber 14 of a resilient bellows 15 through a valve comprising the valve body 12 and the valve seat 13 therefor. The resilient bellows 15 is closed at the top thereof by means of a partition 16 which is connected to the valve body 12 by a stem 17 connected to the valve body 12. A resilient bellows 18 rests upon and is connected to the opposite side of the partition 16. The chamber 19 confined by the bellows 18 is connected with the main line 1 by a conduit 20. It will be evident that valve 12, 13 will close when the pressure prevailing in chamber 14 and acting upon the partition 16 will exceed the pressure in the bellows 19.

The chamber 14 communicates through a conduit 21 with the chamber 22 of the resilient bellows 23 which chamber 22 is closed at its lower end by a front wall 24. A resilient bellows 27 rests from below against said front wall 24. The resilient bellows 27 confines a chamber 26.

The front wall 24 has extending therethrough a tubular member 28 provided with a restricted orifice or orifice plate 29. The tubular member 28 has its lower end provided with slots 30 and is closed by a bottom 31. This bottom 31 forms the valve body of a valve the seat of which is formed by the end 32 of a conduit 33 by means of which the chamber 26 communicates with the inlet of a gas meter 34. On both sides of the bellows 23, 27 and 9, 8, there is provided a lever 36 one end of which is linked to the front wall 10 by means of a pivot 37 and which has its central portion linked to the front wall 24 by means of a pivot 38. The other end of lever 36 is pivotally connected by a pivot 39 with one end of a rod 40 the other end of which is tiltably connected to a fixed support 41.

Operation

Before describing the operation proper, it may be briefly stated that starting from the occurring maximum pressure in line 1, the ratio of the diameter of the bellows 18 and 15 and the pressure of the auxiliary fluid flow are so selected that the full pressure of the auixiliary flow in the bellows 14, in other words, the pressure which would form when no auixilary flow is discharged from the bellows 14, will press the partition or end wall 16 upwardly, while valve 12, 13 will be adapted to close.

Assuming now that pressure prevails in the main line while no fluid flow occurs, the resilient bellows 18 will have the tendency to stretch thereby opening the valve 12, 13 through the intervention of the partition 16 and the valve stem 17. The auxiliary fluid flow will then from the feeding line 11 pass into the chamber 14 and will do so until a pressure has built up in the chamber 14 which will counterbalance the pressure conveyed from the main line 1 through conduit 20 into the chamber 19. The pressure in the chamber 14 will thus always be proportional to the pressure in chamber 19. At the same time an auxiliary fluid flow passes through passage 21 into the bellows 22 and from here through the tubular member 28, orifice plate 29, and slots 30 into the chamber 26 so that the same pressure will prevail in chambers 14, 22 and 26. In this connection it is to be borne in mind that the pressure in the chamber 6 equals the pressure in chamber 7, and that the front wall 10 will by means of the lever 36 exert no force upon said front wall 24 and thereby will likewise exert no pressure upon the valve 31, 32. In other words, the valve 31, 32 is closed or would be closed, inasmuch as the auxiliary fluid flow passing through pipe 33 to the gas meter 34 would have to pass through the orifice plate 29.

If then a flow occurs in main line 1, a force will be built up at the front wall 10 through conduit 4 and chamber 6 on one hand while another force will be built up by means of the fluid passing through conduit 5 and the bellows chamber 7. This force, as will be evident, will equal the difference in pressure at the orifice plate 3. Such proportional axial force will also occur at the front wall 24. This wall 24 will open the valve 31, 32 to such an extent that the pressure difference between the pressure prevailing in bellows 22 and the pressure prevailing in bellows 26 will balance the axial force on the wall 24. In conformity with this difference in pressure, auxiliary fluid will flow from the bellows 22 into the bellows 26 through the orifice plate 29 and thus to the gas meter 34. Consequently, the pressure difference at the orifice plate 29 will be proportional to the pressure difference or effective head at the orifice plate 3.

Referring now to the embodiment shown in Fig. 2, parts similar to those mentioned in connection with Fig. 1 have been designated with the same reference numerals as in Fig. 1 but with the suffix "a". As will be seen from Fig. 2, the elements 6 to 9 and 37 to 41 employed in Fig. 1 have been discarded and the resilient bellows 23a, 27a are arranged within a container 50, 51 having the shape of a double truncated cone. In the plane of the partition 52 corresponding to the front wall 24, there is arranged an annular diaphragm 53 which has its outer edge connected to the container 50, 51 and has its inner edge connected to the partition 52. In this way, two chambers 54 and 55 are formed which communicate with the conduits 4a and 5a respectively. The pressure difference occurring in chambers 54 and 55 in view of the fluid flow through the orifice plate 3 produces a force which is conveyed to the partition 52 and actuates the same in the same manner as the force acting upon the wall 24 of Fig. 1 in view of the pressure difference in chambers 6 and 7.

With the embodiment of Fig. 1 and that of Fig. 2 it will thus be clear that ahead of the fluid flow governor 23, 27, 24, 28, 29, 31 and 32 and 23a, 27a, 52, 28a, 29a, 31a and 32a the pressure of the auxiliary fluid flow will be changed in conformity with the pressure in the main line by a pressure control valve 12 to 19 and 12a to 19a which is independent of the fluid flow governor.

It is, of course, understood that the present invention is, by no means, limited to the particular constructions shown in the drawing but also comprises any modifications within the scope of the appended claims.

What I claim is:

1. In a flow meter which for measuring the quantity of a main flow in a main line with a restrictor therein measures a proportional quantity of flow of an auxiliary fluid flow, the combination of: a first resilient bellows having an opening for connection with said main line, a second resilient bellows having one end wall in common with said first bellows and having an opening for connection with an auxiliary fluid source, valve means for controlling said last mentioned opening, said valve means including a valve member connected to said one end wall, a fluid flow control device comprising a third resilient bellows and a fourth resilient bellows separated from each other by a common partition, passage means continuously effecting communication between the interior of said second bellows and the interior of said third bellows, said fourth bellows having an outlet for connections with a fluid meter, a valve member controlling the flow of fluid from said fourth bellows through said outlet, said valve member being supported by said partition, said passage means continuously establishing communication between the interior of said third and said fourth bellows, an additional restrictor arranged within said passage means, and means operatively connected to said partition for respectively exposing opposite sides of said partition to the pressure in the main line on the upstream side and the downstream side of said first mentioned restrictor.

2. For use with a flow meter, a proportional flow producing system which for measuring the quantity of a main flow in a main line with a pressure drop creating restrictor therein measures a proportional quantity of flow of an auxiliary fluid flow, the combination of: a first fluid flow control device for controlling the flow of an auxiliary fluid flow therethrough, said control device including first valve means responsive only to a difference in pressure between said main fluid flow and said auxiliary fluid flow on the downstream side of said valve means, a second fluid flow control device arranged on the downstream side of said first control device and having an inlet communicating with said first control device and an outlet, said second control device including second valve means movable independently of said first valve means for controlling said outlet and also including restrictor means on the upstream side of said second valve means, said second valve means being responsive only to a difference in pressure on one side and the other side of said restrictor means and also to a difference in pressure on the downstream side of said restrictor in the main line and on the upstream side of said restrictor.

3. For use with a flow meter, a proportional flow producing system which for measuring the quantity of a main flow in a main line with a pressure drop creating restrictor therein measures a proportional quantity of flow of an auxiliary fluid flow, the combination of: a first control unit comprising a first resilient bellows having an opening for connection with said main line and also comprising a second resilient bellows having one end wall in common with said first bellows and having an inlet opening for connection with a source of an auxiliary fluid flow, first valve means for controlling said opening, said valve means including a valve member connected to said end wall so as to be movable thereby, a second control unit arranged in series with said first control unit and having an inlet communicating with said second bellows and having an outlet, said second control unit including second valve means movable independently of said first valve means for controlling said outlet, said second control unit also including restrictor means on the upstream side of said second valve means, said second valve means being responsive to a difference in pressure on one side and the other side of said restrictor means and also to a difference in pressure on the downstream side of said restrictor in the main line and on the upstream side of said restrictor.

4. A flow meter according to claim 3, in which the diameter of said first bellows is less than the diameter of said second bellows.

5. For use with a flow meter, a proportional flow producing system which for measuring the quantity of a main flow in a main line with a pressure drop creating restrictor therein measures a proportional quantity of flow of an auxiliary fluid flow, the combination of: a first control unit comprising a first resilient bellows having an opening for connection with said main line and also comprising a second resilient bellows having one end wall in common with said first bellows and having an inlet opening for connection with a source of an auxiliary fluid flow, first valve means for controlling said opening only, said valve means including a valve member connected to said end wall so as to be movable thereby, a second control unit comprising a third resilient bellows and a fourth resilient bellows and partition means connected to said third and fourth bellows and separating the same from each other, the interior of said third bellows continuously communicating with the interior of said second bellows, passage means continuously effecting communication between the interior of said third bellows and said fourth bellows, fluid flow restricting means arranged in said passage means, said fourth bellows being provided with a discharge opening, second valve means arranged to control said last mentioned opening only and operable independently of said first valve means, said second valve means including a valve member connected to and operable by said partition means, and means yieldably supporting said partition means and having a first inlet and a second inlet respectively arranged for connection with said main line, on the upstream side and on the downstream side of said pressure drop creating restrictor in said main line.

6. For use with a flow meter, a proportional flow producing system which for measuring the quantity of a main flow in a main line with a pressure drop creating restrictor therein measures a proportional quantity of flow of an auxiliary fluid flow, the combination of: a first control unit comprising a first resilient bellows having an opening for connection with said main line and also comprising a second resilient bellows having one end wall in common with said first bellows and having an inlet opening for connection with a source of an auxiliary fluid flow, first valve means for controlling said opening only, said valve means including a valve member connected to said end wall so as to be movable thereby, a second control unit comprising a third resilient bellows and a fourth resilient bellows and partition means connected to said third and fourth bellows and separating the same from each other, passage means continuously effecting communication between the interior of said third bellows and said fourth bellows, fluid flow restricting means arranged in said passage means, said fourth bellows being provided with an outlet opening, second valve means arranged to control said last mentioned opening only and operable independently of said first valve means, said second valve means including a valve member connected to and operable by said partition means, a casing surrounding said third and fourth bellows, and an annular diaphragm supporting said partition means, said casing confining with said diaphragm and a portion of said partition means as well as with the outside of said third and fourth bellows a first and second annular chamber, each of said first and second annular chambers having an opening for respective connection with said main line on the downstream side and the upstream side of the restrictor in said main line.

7. For use with a flow meter, a proportional flow producing system which for measuring the quantity of a main flow in a main line with a pressure drop creating restrictor therein measures a proportional quantity of flow of an auxiliary fluid flow, the combination of: a first control unit comprising a first resilient bellows having an opening for connection with said main line and also comprising a second resilient bellows having one end wall in common with said first bellows and having an inlet opening for connection with a source of an auxiliary fluid flow, first valve means for controlling said opening only, said valve means including a valve member connected to said end wall so as to be movable thereby, a second control unit comprising a third resilient bellows and a fourth resilient bellows and partition means connected to said third and fourth bellows and separating the same from each other, passage means continuously effecting communication between the interior of said third bellows and said fourth bellows, fluid flow restricting means arranged in said passage means, said fourth bellows being provided with a discharge opening, second valve means arranged to control said last mentioned opening only and operable independently of said first valve means, said second valve means including a valve member connected to and operable by said partition means, a fifth and a sixth resilient bellows, and additional partition means common to and separating said fifth and sixth bellows from each other and being connected to said first mentioned partition means, each of said fifth and sixth bellows having an opening for respective connection with said main line on the downstream side and on the upstream side of the restrictor therein.

8. A flow meter according to claim 7, in which said first mentioned partition means and said additional partition means are interconnected by means of a lever.

9. For use with a flow meter, a proportional flow producing system which for measuring the quantity of a main flow in a main line with a restrictor therein measures a proportional quantity of flow of an auxiliary fluid flow, the combination of: a first fluid flow control device for said auxiliary fluid flow, said first control device including a first chamber having an inlet for connection with said main line and also including a second chamber having an inlet opening for connection with a source of auxiliary fluid, first valve means responsive only to a difference in pressure between said first chamber and said second chamber for controlling said opening, a second control device including a first chamber communicating with the second chamber of said first control device and also including a second chamber, passage means having restricting means therein and establishing communication between the first chamber and the second chamber of said second control device, the second chamber of said second control device having a discharge outlet, second valve means controlling said outlet and movable independently of said first valve means, said second control device also including a third chamber having an opening for connection with said main line on the downstream side of the restrictor therein, said second control device also including a fourth chamber having an opening for connection with said main line on the upstream side of the restrictor therein, and partition means separating from each other the first chamber and the second chamber of said second control device and also separating said third and fourth chambers from each other, said partition means being operatively connected to said second valve means for actuating the latter in response only to a difference in pressure in said first chamber and said second chamber of said second control device and also in response to a difference in pressure in said third chamber and said fourth chamber.

References Cited in the file of this patent
UNITED STATES PATENTS

| | | |
|---|---|---|
| 1,638,101 | Roucka | Aug. 9, 1927 |
| 1,992,343 | Ahnstrom | Feb. 26, 1935 |
| 2,399,938 | Pett | May 7, 1946 |
| 2,509,078 | Stover | May 23, 1950 |

FOREIGN PATENTS

| | | |
|---|---|---|
| 907,467 | Germany | Mar. 25, 1954 |
| 783,174 | Great Britain | Sept. 18, 1957 |